March 24, 1964 J. P. DARLING 3,125,979
SHIP FENDER

Filed June 20, 1961 2 Sheets-Sheet 1

INVENTOR
James P. Darling
BY McCoy, Greene + TeGrotenhuis
ATTORNEYS

March 24, 1964   J. P. DARLING   3,125,979
SHIP FENDER
Filed June 20, 1961   2 Sheets-Sheet 2
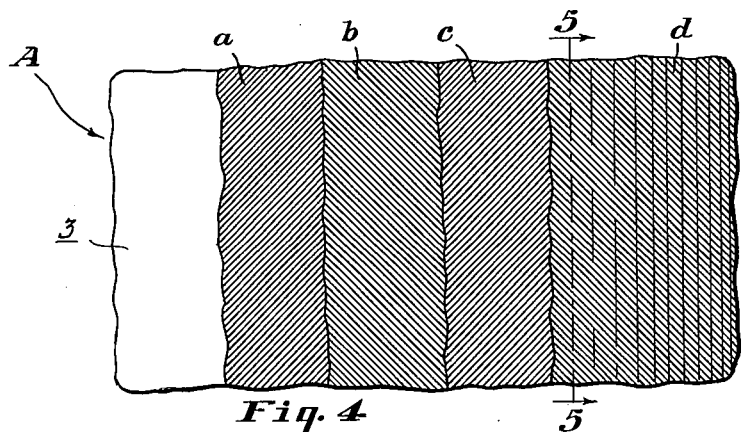
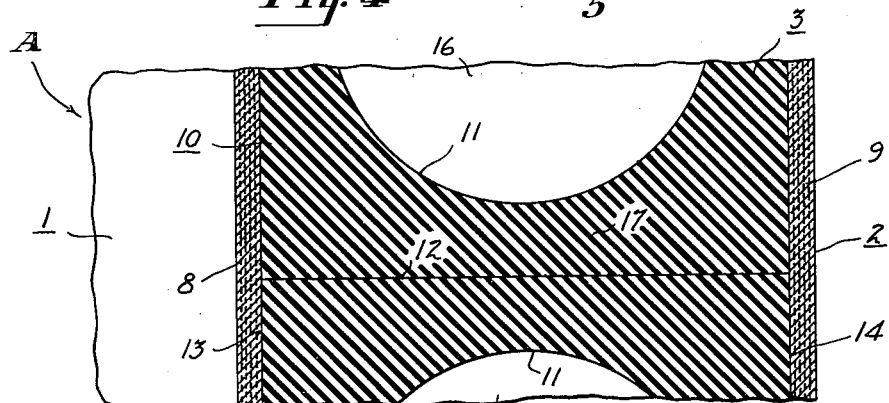
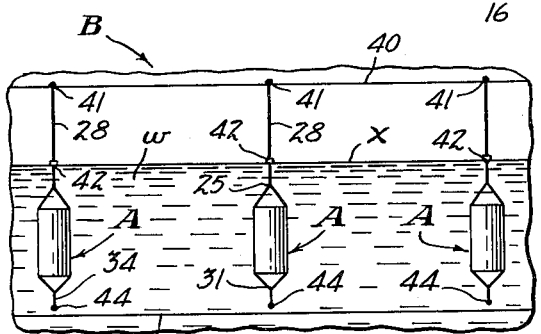
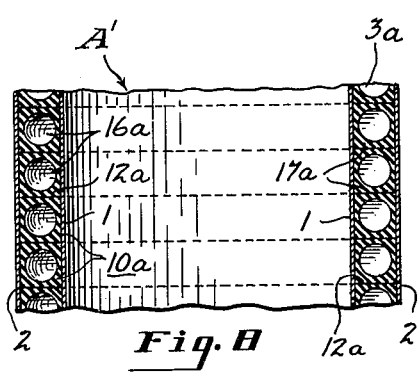
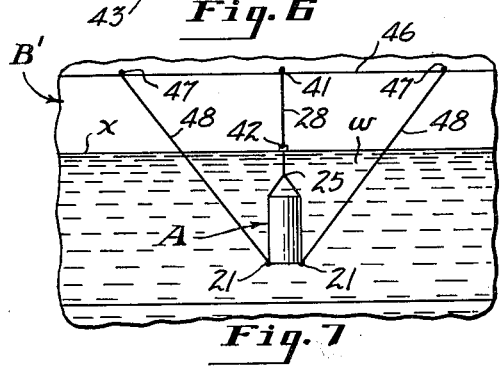
INVENTOR
James P. Darling
BY McCoy, Greene & Te Grotenhuis
ATTORNEYS

United States Patent Office 3,125,979
Patented Mar. 24, 1964

3,125,979
SHIP FENDER
James P. Darling, Mogadore, Ohio, assignor to The General Tire & Rubber Company, Akron, Ohio, a corporation of Ohio
Filed June 20, 1961, Ser. No. 118,372
10 Claims. (Cl. 114—219)

The present invention relates to protective cushions for ships, submarines, wharves and the like and more particularly to an improved ship fender having concentric, cylindrical, fabric-reinforced walls separated by elastic cushions.

Heretofore, hundreds of different cushions have been proposed to prevent damage to ships during loading or unloading adjacent other ships or adjacent wharves, piers, or other stationary objects. The previously proposed cushioning devices were either ineffective or expensive, and the problem has never been completely solved. The problem is particularly serious when two ships are in contact as, for example, when fuel or cargo is transferred from one ship to another or from a submarine tender to a submarine.

The present invention provides a simple inexpensive fender which provides maximum protection to a ship such as a sub-tender and which can readily be supported in a predetermined submerged position a short distance below the water line. The durable elastic rubber fender of this invention has been found to be unusually effective in preventing damage to a submarine tender and a submarine when the submarine is being refueled. It may readily be raised out of the water when not in use or lowered to the desired submerged position where it is most effective.

The ship fender of this invention comprises concentric, axially elongated, generally cylindrical walls of fabric-reinforced rubber and cushioning means between the walls for holding them in concentric relation. The cushioning means preferably comprises an elastic rubber annulus or the like having a multiplicity of circumferential web portions closely spaced along the length of the fender and providing passage means including a multiplicity of closely spaced hollow portions which preferably open at the ends of the fender to permit filling of the hollow portions with water. The cushioning annulus may be readily formed by wrapping a vulcanizable rubber strip around the inner cylindrical wall of the fender to provide a helical web and a helical cavity extending from the top to the bottom of the fender. When the fender is cured, the strip is united with the inner and outer cylindrical walls of the fender.

The resulting vulcanized article is much more effective than previously known cushioning devices for protecting a ship against damage due to contact with other objects. The fender of this invention is particularly well suited for use on a subtender to protect such ship when it is refueling a submarine.

An object of the present invention is to provide a simple inexpensive ship fender which is efficient and durable and which may be mass-produced without expensive equipment.

A further object of the invention is to provide a simple inexpensive fender formed principally of elastic rubber which functions efficiently when submerged.

Other objects, uses and advantages of the present invention will become apparent to those skilled in the art from the following description and claims and from the drawings in which:

FIGURE 4 is a fragmentary elevational view of the fender with individual layers broken away to show the wire reinforcement;

FIGURE 5 is a fragmentary sectional view similar to FIG. 3 and on a larger scale taken substantially on the line 5—5 of FIG. 4;

FIGURE 6 is a fragmentary side elevational view on a reduced scale showing schematically a ship having mounted thereon a series of submerged fenders of the type shown in FIGS. 1 to 5;

FIGURE 7 is a fragmentary view similar to FIG. 6 showing schematically a ship having one of the fenders of FIGS. 1 to 5 mounted in a submerged position in a different manner; and FIGURE 8 is a fragmentary sectional view showing a modified form of fender similar to the fender of FIG. 1 but having toroidal cavities rather than a helical cavity.

Figures 1, 2, 3:
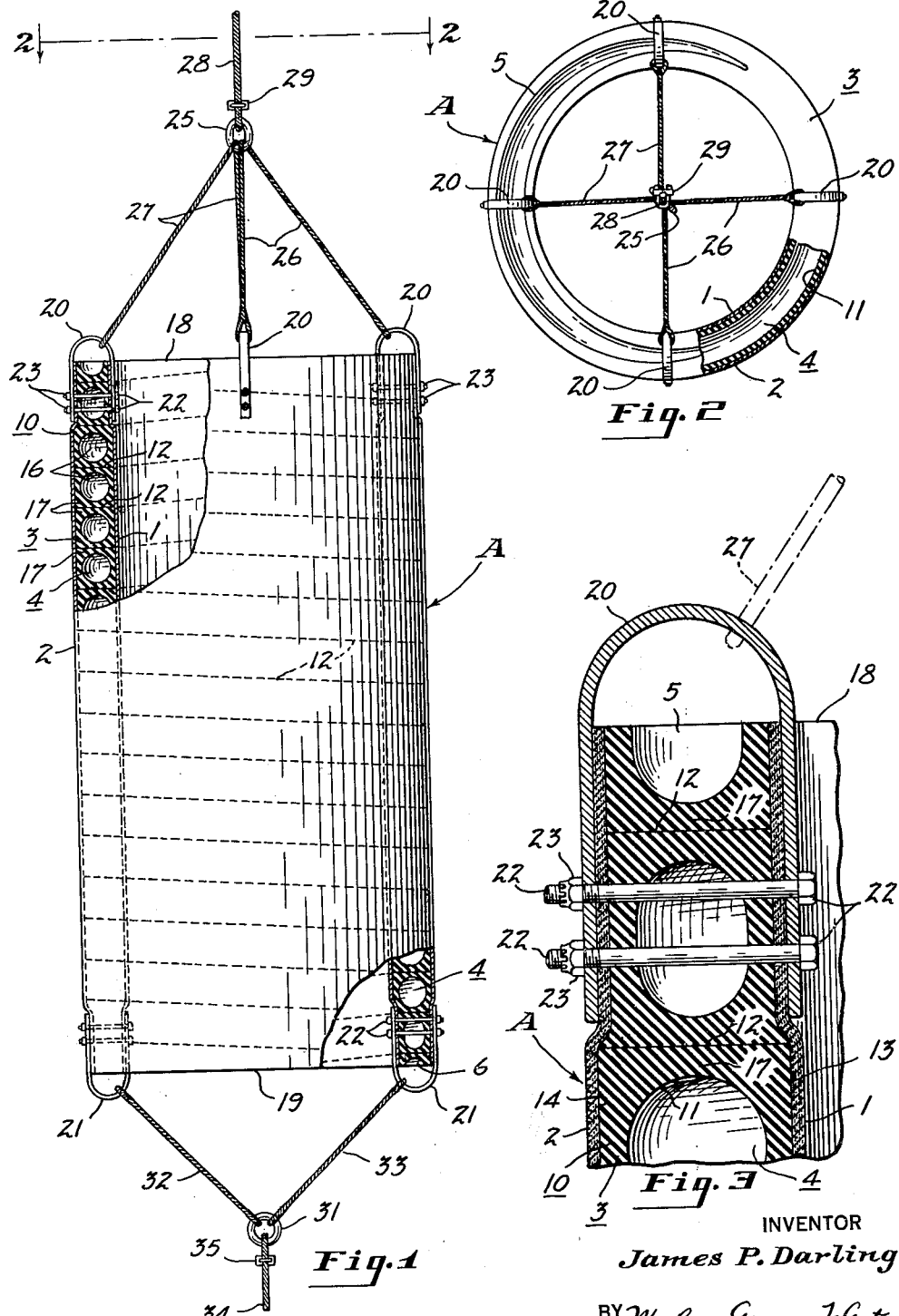
FIGURE 1 is an elevational view on a reduced scale with parts broken away and shown in section showing the preferred form of fender according to the present invention.
FIGURE 2 is a top view looking in the direction of the arrows 2—2 of FIG. 1 and on the same scale with parts broken away and shown in section.
FIGURE 3 is a fragmentary view of the fender of FIG. 1 on a larger scale.

FIGS. 1 to 5, which are drawn substantially to scale and in which like parts are identified by the same numerals throughout the several views, show a protective fender A constructed according to the present invention and comprising an inner cylindrical wall 1, an outer cylindrical wall 2 concentric to the wall 1, and an elastic rubber cushioning annulus 3 between said walls and vulcanized thereto. The annulus 3 preferably has a helical cavity 4 of uniform rounded cross section extending the full length of the fender A and having upper and lower end portions 5 and 6 which are open to permit free flow of water into the helical cavity.

The walls 1 and 2 are formed of a multiplicity of bias-cut rubberized fabric plies 8 and 9, respectively, which may be formed by calendering a rubber layer on parallel strands or cables of steel, nylon, or other reinforcing material. The plies 8 and 9 may, for example, be conventional nylon or rayon tire cord fabric or conventional rubberized wire fabric as disclosed, for example, in United States Patent No. 2,786,507. The number of plies may vary considerably and may be ten or more but is usually three to eight plies. Each ply is preferably applied so that the strands of wire or other material cross the strands of the next adjacent ply as shown, for example, in FIG. 4 as is the conventional practice in building pneumatic tires. The walls 1 and 2 may be constructed in exactly the same manner or may be provided with a slightly different number of plies.

It is preferable to construct the elastic rubber cushioning annulus 3 from an extruded vulcanizable rubber strip of predetermined cross section which may be wound in the form of a helix around the inner wall 1 prior to curing of the article. The fender A shown herein is made by employing an extruded rubber strip 10 having a uniform cross section throughout its length and having parallel surfaces 12 of straight cross section and an internal surface 11 of circular cross section. The strip 10 has a rectangular external cross section as shown herein. When the strip 10 is wound around the wall 1, the side surfaces 12 are in engagement and the other parallel outer surfaces provide the annulus 3 with cylindrical inner and outer surfaces 13 and 14 extending the full length of the fender A.

The cushioning annulus 3 has closely spaced circumferential hollow portions 16 separated in cross section by a multiplicity of closely spaced web portions 17 which are preferably regularly spaced throughout the length of the fender A from the flat upper surface 18 thereof to the flat parallel bottom surface 19. Each web portion 17 preferably has an average width, measured in the direction of the axis of the fender A, which is less than half the radial distance between the concentric walls 1 and 3. It is most convenient to provide the regular helical arrangement of the portions 16 and 17, but it will be understood that the advantages of the invention may be obtained with somewhat different arrangements as shown, for example, in FIG. 8.

Various means may be provided for supporting each fender A in an operating position on a ship, wharf or other object. As herein shown, the fender A is provided with metal attaching straps at both the top and the bottom, but it will be understood that the fender will function effectively even if the attaching means is omitted from the bottom of the fender since the fender will sink readily and will be held in its submerged position by its weight alone.

As herein shown, the fender A is provided with four regularly circumferentially spaced attaching straps 20 at the top of the fender and two similar attaching straps 21 at the bottom of the fender. Such straps 20 and 21 may be formed of galvanized steel, stainless steel or other corrosion-resistant material and may, for example, have a width of one inch or so and a thickness of about 0.3 to 0.4 inch. Each of the U-shaped straps 20 and 21 is held in place by a pair of clamping bolts 22 which project through the walls 1 and 2 and the annulus 3 as shown in FIG. 3 and are held in place by nuts 23 screwed on the ends of the bolts. The bolts extend through the U-shaped metal strap and deform the cushioning annulus 3 somewhat as indicated in FIG. 3 when tightened.

The fender A may be held in place in a submerged or partially submerged position in various ways. As shown herein, an upper connecting ring 25 is provided in conjunction with a pair of short connecting cables 26 and 27 which extend through said ring and are connected at their looped ends to the straps 20. This provides a convenient harness which may be connected to a metal supporting cable 28 by suitable means including a conventional cable clamp 29.

If it is desired to provide hold-down means at the bottom of the fender, suitable cables may be connected to the straps 21. As herein shown, a lower connecting ring 31 is supported by short connecting cables 32 and 33 which are connected between the ring 31 and the straps 21. A hold-down cable 34 similar to the cable 28 is connected to the ring 31 by means of the cable clamp 35.

The number of attaching straps 20 and 21 may vary considerably, and means quite different from those disclosed herein may be employed to locate the fender A on a ship, wharf or pier. Usually it is desirable to provide a greater number of attaching straps at the top of the fender than at the bottom since a greater force is usually required to support the fender than is required to hold its bottom end in position.

FIGURE 6 is a diagrammatic view showing a series of fenders A of the type described above mounted on a ship B such as a submarine tender or the like. The top deck 40 of the ship shown herein is provided with a series of cable connections 41 to which the cables 28 are connected to support the fenders A. The cables are preferably provided with water markers 42 so the each fender may readily be lowered to the proper depth. The ship B is also provided with a series of cable connections 44 below the water line x which may be connected to the cables 34 if such cables are employed to hold the lower end of each fender in position. The cable connections 44 may conveniently be provided at the bilge keel. The hold-down cables 34 prevent swinging of the fender A when the ship brushes against a submarine or other structure and insures that the fender remains in a position where it will protect the ship effectively. The general arrangement shown in FIG. 6 has the advantage that each fender A may roll somewhat about its vertical axis and thereby minimize abrasion. It will be understood, however, that similar rolling may also be obtained when the hold-down cables 34 are omitted.

FIGURE 7 is another diagrammatic view showing another way in which each fender A may be mounted on a ship. As shown in that figure, the ship B' has a deck 46 provided with cable connections 47 on opposite sides of each cable connection 41. The fenders A are supported in submerged position by the supporting cables 28 in the same manner as in FIG. 6, but a pair of stabilizing cables 48 are provided to hold the lower end of each fender A in position. Each cable 48 is connected between the connection 47 and the attaching strap 21 and it is, therefore, unnecessary to make connection with the ship below the water line.

It will be apparent to those skilled in the art that many of the advantages of the present invention may be obtained employing elastic rubber cushioning means somewhat different from the cushioning annulus 3 of FIGS. 1 to 5. FIGURE 8 shows a fragment of a fender A' which is identical with the fender A except that the cushioning annulus 3 is replaced by a cushioning annulus 3a of the same elastic rubber material. The fender A' thus comprises inner and outer fabric-reinforced rubber walls 1 and 2 and a cushioning annulus 3a between said walls and vulcanized thereto. The cushioning annulus 3a is formed by a multiplicity of vulcanizable rubber rings 10a having the same cross section as the strip 10 so as to provide parallel side surfaces 12a which engage the corresponding surfaces of the adjacent rings 10a as shown in FIG. 8. Upon curing of the article the vulcanized rubber is united at 12a to provide an axially continuous annulus 3a having closely spaced hollow toroidal portions 16a and closely spaced web portions 17a throughout the length of the annulus.

The preferred fenders according to this invention have hollow portions which are open to permit filling of the cushioning annulus with water. The elastic webs between the hollow portions may extend axially, but they preferably extend circumferentially to define one or more serpentine passages opening at the top and/or bottom of the fender. The hollow portions or cavities of the cushioning annulus preferably are relatively large (i.e., a diameter greater than half the total radial thickness of the cushioning annulus measured from the surface 13 to the surface 14) so that the total volume of the cavities of the cushion annulus is at least one-fourth the volume of the annular space between the walls 1 and 2. The total volume of the hollow portions 16 is preferably about one-third to two-thirds the total volume of the space between the walls 1 and 2. Such space is preferably filled with water when the fender is submerged.

It will be understood that the size and shape of the fender of this invention may vary considerably. The fender is preferably axially elongated and preferably has an axial length several times its external diameter. Such axial length (i.e., the distance between the surfaces 18 and 19) is usually six to twelve feet and the external diameter of the wall 2 is usually three to six feet. The external radius of the cylindrical fender is several times the total radial thickness of the fender and is usually three to six times such radial thickness measured from the inner surface of the wall 1 to the outer surface of the wall 2.

When the fenders of this invention are used on a sub-tender or other ship of substantial size, the fender is usually very large. The total weight of such fender is usually at least one-half ton and is usually not in excess of two tons although the larger fenders will also provide excellent protection.

Although the size may obviously be varied considerably it should be noted that the fender A which is drawn to scale in FIGS. 1 to 5, has an external diameter of four feet, a length of eight feet and an overall radial thickness of six inches so as to provide an article having a weight of about one ton. The cables 28 and 34 would, therefore, have a substantial diameter (i.e., in the neighborhood of one-half inch). As shown in FIGS. 6 and 7, each fender A is supported about four feet below the water line x but it will be apparent that this distance may vary considerably and that advantages of the invention may be obtained whether or not the fender is fully or partially submerged.

The fender A shown herein is of a type which may be manufactured easily at low cost and which is nevertheless very durable and very effective. It will be readily apparent from the drawings how such article may be manufactured. The inner wall 1 is first formed on a suitable cylindrical support or form by wrapping a series of plies 8 of vulcanizable bias cut rubberized fabric around the form with the parallel strands or cords of each ply crossing the strands of the next adjacent ply as is the conventional practice in building pneumatic tires. Such fabric, which may be a conventional nylon or rayon tire fabric or a conventional rubberized wire fabric having parallel wire strands or cables arranged in closely spaced arrangement (i.e., 20 to 30 ends per inch) preferably is cut so that each ply is of a size to cover the form when wrapped once around such form and the cord angle of such bias-cut fabric is preferably 20 to 50 degrees and is preferably the same for each ply although this is not essential. The wall 1 shown herein has four plies 8, but it will be understood that the number of plies may vary considerably and that a greater number of plies may be necessary when synthetic fiber cords are employed rather than steel cables or strands.

After the vulcanizable inner wall 1 has been formed, the extruded vulcanizable rubber strip 10 is wrapped around the wall 1 with the surfaces 12 in engagement at each convolution as shown in FIG. 1, the strip 10 preferably having a length sufficient to form the entire cushioning annulus 3 without the need for splicing. If desired, the strip 10 may be partially cured before being wrapped around the wall 1 but this is not essential.

After the vulcanizable annulus 3 has been formed around the wall 1, the outer wall 2 is formed like the wall 1 by wrapping a series of plies 9 of vulcanizable bias-cut rubberized wire fabric around the helix formed by the strip 10 with the wire strands of each ply crossing the strands of the next adjacent ply as shown in FIG. 4. It will be noted that the parallel wires of the second ply b of FIG. 4 are arranged to cross the wires of the first and third plies a and c. The fourth and last ply d has its wires arranged at the same angle as the wires of the ply b. The alternate arrangement of the plies provides the wall with a maximum strength for a given number of plies, but it will be understood that the construction may be varied considerably.

After the vulcanizable outer wall 2 has been formed around the helical strip 10, the article may be heated to vulcanizing temperature and cured to the elastic state to unite the walls 1 and 2 with the cushioning annulus 3, to unite the plies of said walls, and to unite the surfaces 12 of each convolution of the strip 10 with the corresponding surfaces of the adjacent convolutions and thereby form a unitary article.

The rubber compositions employed in the walls 1 and 2 may be conventional vulcanizable carcass or tread compositions of the type ordinarily used in pneumatic tires. It is preferable to provide adhesion between the reinforcing wires or cords and the rubber as in conventional tires so as to provide an article having maximum strength and durability. The material employed in the strip 10 may be a conventional natural rubber or synthetic rubber composition such as a conventional tire tread composition. Such rubber composition is preferably relatively stiff and preferably contains at least 50 parts by weight of a reinforcing furnace carbon black per 100 parts of rubber hydrocarbons. The rubber composition is preferably such that when cured the rubber of the cushioning annulus 3 has a Shore A hardness measured on a conventional Shore durometer of about 75 to 95. The rubber strip 10 is preferably formed of an oil-extended butadiene styrene rubber composition of the type disclosed in United States Patent No. 2,964,083, but it will be understood that other materials such as cis-polybutadiene and cis-polyisoprene or the like may also be employed.

Satisfactory results may, for example, be obtained using a conventional SBR oil-extended tire tread composition containing 100 parts by weight of a butadiene-styrene copolymer having a Mooney viscosity of 120 to 180 and 70 to 100 parts or more of high abrasion furnace carbon black.

It will be understood that the above description is by way of illustration rather than limitation and that, in accordance with the provisions of the patent statutes, variations and modifications of the specific structures disclosed herein may be made without departing from the spirit of the invention.

Having described my invention, I claim:

1. A submersible fender for ships, wharves or the like comprising an elastic rubber cushioning annulus having an axial length several times its diameter and a radius several times its radial thickness, said annulus having a multiplicity of continuous circumferential hollow portions which are closely spaced in axial cross section, the cavities of said annulus being spaced radially from the internal and external surfaces of said annulus, a thin outer wall of fabric-reinforced rubber vulcanized to the outer surface of said annulus throughout the length and circumference thereof, and a thin inner wall of fabric-reinforced rubber vulcanized to the inner surface of said annulus throughout the length and circumference thereof, said annulus being formed by winding a hollow vulcanizable rubber strip of uniform externally square cross section around a wire-fabric-reinforced vulcanizable rubber layer to form a helix around said inner wall, and thereafter vulcanizing the fender at elevated temperature, said hollow portions being formed by the turns of said helix.

2. A submersible fender as defined in claim 1 wherein each of said inner and outer walls is formed from a series of plies of rubberized bias-cut tire fabric, each ply extending the full length and circumference of the wall and having parallel strands crossing the strands of the next adjacent ply.

3. A submersible fender as defined in claim 2 wherein the tire fabric comprises closely spaced parallel strands of wire embedded in rubber, said strands having a predetermined cord angle of about 20° to 50°.

4. A submersible fender as defined in claim 2 wherein a plurality of circumferentially spaced cable-receiving attaching members are provided at each end of said fender.

5. In combination, a ship, a plurality of protective fenders, each fender comprising a thick axially elongated elastomeric cushioning annulus having generally cylindrical inner and outer surfaces and thin inner and outer multiple-ply fabric-reinforced cylindrical walls bonded to and enclosing said annulus, said cushioning annulus having a multiplicity of circumferential hollow portions closely spaced in axial cross section throughout the length of said fender and having a total volume which is at least one-third the volume of the space between said inner and outer surfaces of said annulus, said hollow portions being filled with water, cable means connected to said ship and one end of each fender to support the fender, and cable means connected to said ship and the opposite end of each said fender to hold said fender in a predetermined submerged position at the side of said ship.

6. A submersible ship fender comprising a generally cylindrical axially elongated elastic rubber cushioning annulus having a helical water-receiving cavity extending the full length thereof, an outer fabric-reinforced rubber wall vulcanized to said annulus throughout the length and circumference thereof, said wall comprising a series of plies of wire tire fabric having strands disposed on a bias at a definite angle of from 20 degrees to 50 degrees, the strands in alternate plies running in opposite directions, an inner fabric-reinforced rubber wall vulcanized to the inner surface of said annulus throughout the length and circumference thereof, said inner wall being formed of a series of plies of said wire tire fabric, and means for supporting said fender in a submerged position.

7. A submersible ship fender comprising a thin cylindrical axially elongated inner wall of wire-reinforced rubber having a series of plies of bias-cut rubberized wire fabric arranged with the wire strands of each ply crossing the strands of the next adjacent ply, a thick extruded hollow rubber strip of externally rectangular cross section spirally wound around said inner wall in the form of a helix having each convolution contacting the next adjacent convolution and extending the length of the inner wall, said helix being vulcanized to said inner wall, and a thin cylindrical axially elongated outer wall of wire-reinforced rubber having a series of plies of bias-cut rubberized wire fabric arranged with the wire strands of each ply crossing the strands of the next adjacent ply, said outer wall being vulcanized to said helix, said helix being formed of a reinforced rubber composition containing at least 50 parts of carbon black per 100 parts of rubber hydrocarbons.

8. A submersible fender for ships, wharves or the like comprising concentric axially elongated cylindrical walls of fabric-reinforced elastic rubber, said fender having an external radius at least 3 times the total radial thickness of the fender, and elastic means between said walls held in axial alignment by said walls for holding the walls in concentric relation, each of said cylindrical walls comprising 3 to 8 plies of bias-cut rubberized wire fabric, said elastic means comprising an elastic rubber annulus having an open internal helical cavity extending the full length of the fender.

9. A ship fender comprising concentric axially elongated cylindrical walls of fabric-reinforced elastic rubber and a tubular elastic rubber cushion between said walls for holding the walls in concentric relation, said cushion having a multiplicity of circumferential elastic web portions closely spaced along the length of the fender and defining a multiplicity of closely spaced water-receiving cavities, said fender having an axial length of at least 6 feet, an external diameter of at least 3 feet, and an external radius at least 3 times the radial thickness of the fender, said web portions defining continuous helical water-receiving passage means communicating with the upper and lower ends of the fender.

10. A submersible tubular ship fender comprising concentric axially elongated cylindrical walls of fabric-reinforced elastic rubber and a tubular elasic rubber cushion between said walls for holding the walls in concentric relation, said tubular cushion having rubber portions of externally rectangular cross section which are hollow and bonded together to provide the cushion with (1) an axially continuous internal cylindrical surface, (2) an axially continuous external cylindrical surface and (3) a multiplicity of circumferential elastic web portions regularly spaced along the length of the fender, each pair of successive web portions providing a circumferential cavity of uniform rounded cross section which is spaced radially from the internal and external cylindrical surfaces of said tubular cushion, said fender having an external radius at least 3 times the radial thickness of the fender.

References Cited in the file of this patent

UNITED STATES PATENTS

| | | |
|---|---|---|
| 1,036,428 | Bissell | Aug. 20, 1912 |
| 1,457,892 | Blackwelder | June 5, 1923 |
| 2,413,210 | Blackman | Dec. 24, 1946 |
| 2,424,635 | Schwall | July 29, 1947 |
| 2,874,722 | Hamblin | Feb. 24, 1959 |

FOREIGN PATENTS

| | | |
|---|---|---|
| 18,213 | Great Britain | 1911 |
| 432,104 | Great Britain | July 22, 1935 |